United States Patent
Toda et al.

(10) Patent No.: US 10,948,292 B2
(45) Date of Patent: Mar. 16, 2021

(54) SENSOR ERROR CALCULATING DEVICE, ATTITUDE ANGLE CALCULATING APPARATUS, METHOD OF CALCULATING SENSOR ERROR AND METHOD OF CALCULATING ATTITUDE ANGLE

(71) Applicant: Furuno Electric Co., Ltd., Nishinomiya (JP)

(72) Inventors: Hiroyuki Toda, Nishinomiya (JP); Naomi Fujisawa, Nishinomiya (JP); Hiraku Nakamura, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 351 days.

(21) Appl. No.: 15/779,482

(22) PCT Filed: Oct. 25, 2016

(86) PCT No.: PCT/JP2016/081570
§ 371 (c)(1),
(2) Date: May 25, 2018

(87) PCT Pub. No.: WO2017/090360
PCT Pub. Date: Jun. 1, 2017

(65) Prior Publication Data
US 2018/0259333 A1 Sep. 13, 2018

(30) Foreign Application Priority Data
Nov. 27, 2015 (JP) .............................. JP2015-231195

(51) Int. Cl.
*G01C 17/38* (2006.01)
*G01C 21/20* (2006.01)
(Continued)

(52) U.S. Cl.
CPC ............. *G01C 17/38* (2013.01); *G01C 17/02* (2013.01); *G01C 21/20* (2013.01); *G01C 21/28* (2013.01); *G01S 19/14* (2013.01); *G01S 19/55* (2013.01)

(58) Field of Classification Search
CPC ........ G01C 17/02; G01C 17/38; G01C 21/20; G01C 21/28; G01S 19/14; G01S 19/55
See application file for complete search history.

(56) References Cited

U.S. PATENT DOCUMENTS

| 2003/0154049 A1* | 8/2003 | Toda ....................... G01S 19/55 |
| | | 702/151 |
| 2006/0217921 A1* | 9/2006 | Kourogi ................. G01C 17/38 |
| | | 702/150 |

FOREIGN PATENT DOCUMENTS

JP H0518770 A 1/1993
JP H06294651 A * 10/1994
(Continued)

OTHER PUBLICATIONS

ISA Japan Patent Office, International Search Report Issued in Application No. PCT/JP2016/081570, dated Jan. 10, 2017, WIPO, 2 pages.

*Primary Examiner* — Herbert K Roberts
*Assistant Examiner* — John M Royston
(74) *Attorney, Agent, or Firm* — Alleman Hall Creasman & Tuttle LLP

(57) ABSTRACT

The purpose is to accurately and promptly calculate an error of a magnetic sensor. A sensor error calculating device may include a GNSS attitude angle calculating module, a GNSS geomagnetism calculating module, and an error estimating module. The GNSS attitude angle calculating module may calculate a GNSS attitude angle of a movable body based on positioning signals of a GNSS. The GNSS geomagnetism calculating module may calculate a GNSS geomagnetism
(Continued)

based on the GNSS attitude angle. The error estimating module may estimate a sensitivity error, a misalignment error and a bias error of the magnetic sensor by using a magnetic detection value of the magnetic sensor and the GNSS geomagnetism.

6 Claims, 13 Drawing Sheets

(51) Int. Cl.
*G01C 21/28* (2006.01)
*G01S 19/55* (2010.01)
*G01S 19/14* (2010.01)
*G01C 17/02* (2006.01)

(56) References Cited

FOREIGN PATENT DOCUMENTS

| | | |
|---|---|---|
| JP | H06294651 A | 10/1994 |
| JP | H0968431 A | 3/1997 |
| JP | 4814604 B2 | 11/2011 |
| JP | 2012202780 A | 10/2012 |
| JP | 2013072643 A | 4/2013 |
| KR | 20130002086 A * | 1/2013 |

* cited by examiner

SENSOR ERROR CALCULATING DEVICE, ATTITUDE ANGLE CALCULATING APPARATUS, METHOD OF CALCULATING SENSOR ERROR AND METHOD OF CALCULATING ATTITUDE ANGLE

CROSS REFERENCE TO RELATED APPLICATIONS

This application is a U.S. National stage of International Application No. PCT/JP2016/081570 filed on Oct. 25, 2016. This application claims priority to Japanese Patent Application No. 2015-231195 filed on Nov. 27, 2015. The entire disclosure of Japanese Patent Application No. 2015-231195 is hereby incorporated herein by reference.

TECHNICAL FIELD

The present disclosure relates to a method and device for calculating a sensor error, in which an error of a magnetic sensor installed in a movable body, such as a ship, is calculated, and to a method and apparatus for calculating an attitude angle, in which an azimuth, such as a heading, is calculated by using a magnetic detection value of the magnetic sensor.

BACKGROUND ART

Various azimuth calculating devices which detect a geomagnetism by a magnetic sensor and calculate an azimuth of a movable body have conventionally been put in use. The magnetic sensor detects field intensities in two or three orthogonal axes with, for example, voltage. The azimuth calculating devices calculate the azimuth based on a relationship of the detection values for the two or three axes.

General-purpose magnetic sensors are generally known to include an error in its magnetic detection value. Therefore, the azimuth calculating devices correct this error to improve an accuracy of the calculated azimuth.

According to Patent Document 1, a plurality of magnetic detection values are acquired while causing a ship attached with a magnetic sensor to make a full turn, and an error caused by a disturbance magnetic field, included in the magnetic detection values, is calculated based on a trace of the plurality of magnetic detection values.

According to Patent Document 2, a residual magnetic value (magnetic bias) at each azimuth is calculated by using standard geomagnetism data obtained externally, a heading and position calculated using satellite signals, and geomagnetism data corresponding to this position.

According to Patent Document 3, a sensitivity error and bias error of a magnetic sensor are calculated using GPS azimuths acquired in two observations and a magnetic azimuth calculated based on an output value of the magnetic sensor.

REFERENCE DOCUMENTS OF CONVENTIONAL ART

Patent Documents

[Patent Document 1] JP1997-068431A
[Patent Document 2] JP4814604B
[Patent Document 3] JP1993-018770A

DESCRIPTION OF THE DISCLOSURE

Problems to be Solved by the Disclosure

However, with the method described in Patent Document 1, the ship (movable body) attached with the magnetic sensor needs to make the full turn and it requires time in calculating the error of the magnetic sensor.

Further, with the methods described in Patent Documents 2 and 3, since only a portion of the error is calculated, the error cannot be calculated accurately.

Therefore, the purpose of the present disclosure is to provide a method and device for calculating a sensor error, in which an error of a magnetic sensor can accurately and promptly be calculated, and a method and apparatus for calculating an attitude angle, in which an azimuth is accurately calculated by using this sensor error.

SUMMARY OF THE DISCLOSURE

A sensor error calculating device according to the present disclosure may include a GNSS attitude angle calculating module, a GNSS geomagnetism calculating module, and an error estimating module. The GNSS attitude angle calculating module may calculate a GNSS attitude angle of a movable body based on positioning signals of a GNSS. The GNSS geomagnetism calculating module may calculate a GNSS geomagnetism based on the GNSS attitude angle. The error estimating module may estimate a sensitivity error, a misalignment error and a bias error of a magnetic sensor by using a magnetic detection value of the magnetic sensor and the GNSS geomagnetism.

According to this configuration, the GNSS geomagnetism may be calculated based on the GNSS attitude angle without the sensitivity error, the misalignment error and the bias error. Therefore, by estimating the errors using this GNSS geomagnetism, each error (calibration value) of the magnetic sensor may accurately be estimated.

Further, an attitude angle calculating apparatus according to the present disclosure may include the sensor error calculating device described above, an error correcting module and an azimuth calculating module. The error correcting module may correct the magnetic detection value by using the sensitivity error, the misalignment error and the bias error of the magnetic sensor. The azimuth calculating module may calculate an azimuth of the movable body by using the error-corrected magnetic detection value.

According to this configuration, an error of the magnetic detection value of the magnetic sensor may be corrected based on the accurately estimated error, and the azimuth may accurately be calculated.

MODES FOR CARRYING OUT THE DISCLOSURE

Figure 1:
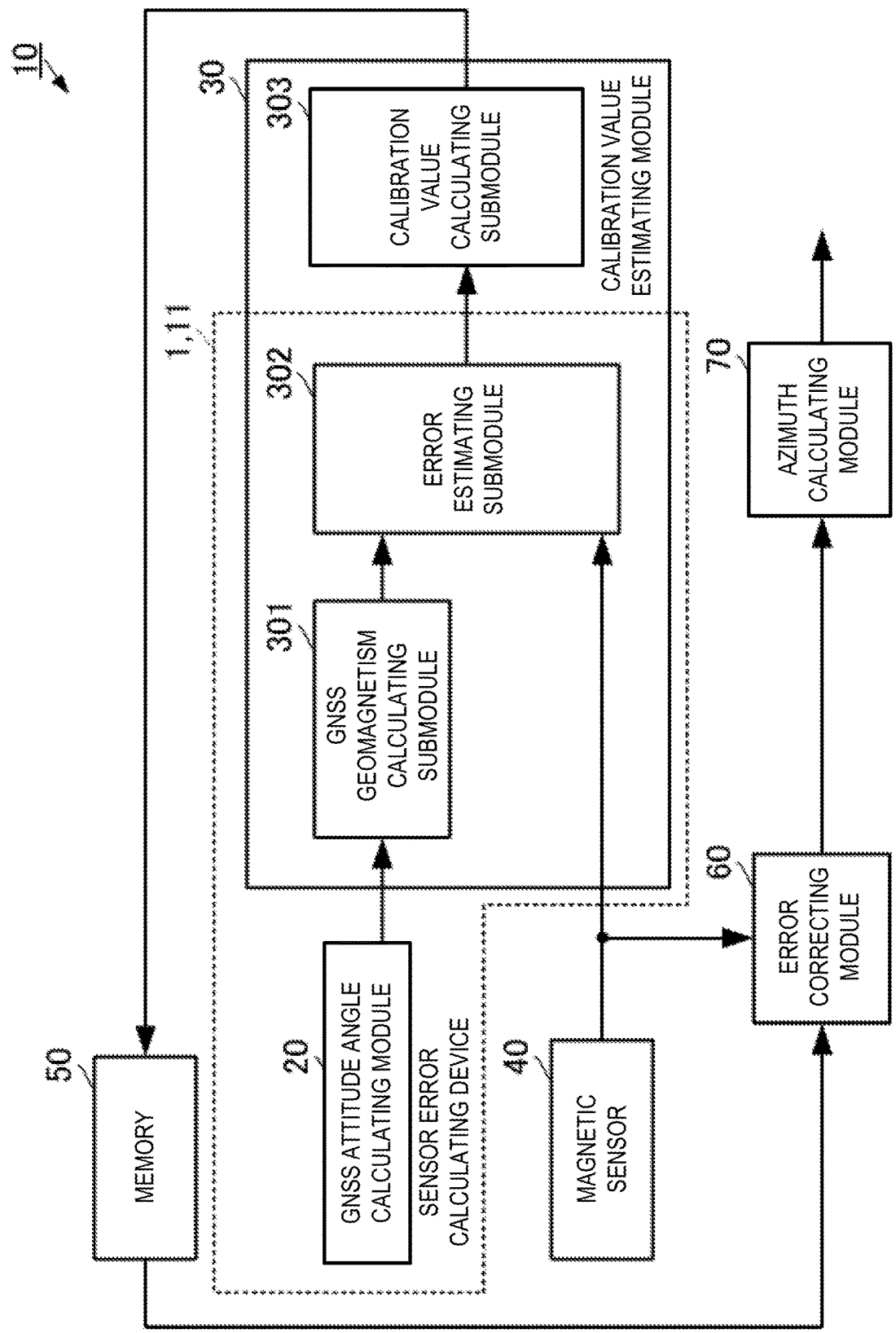
FIG. 1 is a functional block diagram of an attitude angle calculating apparatus according to a first embodiment of the present disclosure.

A method and device for calculating a sensor error and a method and apparatus for calculating an attitude angle according to a first embodiment of the present disclosure are described with reference to the drawings. FIG. 1 is a functional block diagram of an attitude angle calculating apparatus according to the first embodiment of the present disclosure.

The attitude angle calculating apparatus 10 may be attached to a movable body, such as a ship. The attitude angle calculating apparatus 10 may be attached to the movable body so that an x-axis direction of a magnetic sensor 40 (same as an x-axis direction of a GNSS geomagnetism described later) becomes a fore-aft direction of the movable body (a bow direction from a center of the movable body is a positive direction thereof) and a y-axis direction of the magnetic sensor 40 (same as a y-axis direction of the GNSS geomagnetism described later) becomes a port-starboard direction of the movable body (a starboard direction from the center of the movable body is a positive direction thereof). The x-axis direction may correspond to "first direction" of the present disclosure and the y-axis direction may correspond to "second direction" of the present disclosure. Note that the movable body may be a movable body which moves in water, on land and/or in the air, without limiting to the movable body which travels on water, such as the ship. However, the present disclosure may particularly be effective to the movable body, such as the ship, which cannot easily make a sharp turn.

The attitude angle calculating apparatus 10 may include a GNSS attitude angle calculating module 20, a calibration value estimating module 30, the magnetic sensor 40, a memory 50, an error correcting module 60, and an azimuth calculating module 70. The calibration value estimating module 30 may include a GNSS geomagnetism calculating submodule 301, an error estimating submodule 302, and a calibration value calculating submodule 303. The GNSS attitude angle calculating module 20, the GNSS geomagnetism calculating submodule 301, and the error estimating submodule 302 may correspond to a sensor error calculating device 1. The GNSS attitude angle calculating module 20 and the GNSS geomagnetism calculating submodule 301 and the error estimating submodule 302 of the calibration value estimating module 30 may be executed by a hardware processor 11 provided to the sensor error calculating device 1. Note that, the calibration value calculating submodule 303 may also be executed by the hardware processor 11. The GNSS is an abbreviation for Global Navigation Satellite Systems and indicates a satellite positioning system, such as GPS (Global Positioning System), GLONASS, Galileo etc.

A GNSS receiver (not illustrated) may be connected to the GNSS attitude angle calculating module 20, and a GNSS antenna (not illustrated) may be connected to the GNSS receiver. The GNSS receiver and the GNSS antenna may include a plurality of GNSS receivers and a plurality of GNSS antennas. The plurality of GNSS antennas may be fixed to the movable body in a given positional relationship. The plurality of GNSS antennas may receive positioning signals and output them to the GNSS receivers. The GNSS receivers may track the positioning signals and output measurement values obtained by the tracking, which includes carrier phases, to the GNSS attitude angle calculating module 20. Further, in the tracking of the positioning signals, the GNSS receivers may demodulate navigation messages from the positioning signals and output them to the GNSS attitude angle calculating module 20.

The GNSS attitude angle calculating module 20 may calculate an attitude angle (GNSS attitude angle) by a known method using the measurement values and the navigation messages obtained by the tracking of the positioning signals. The GNSS attitude angle may be comprised of three components of a roll angle $\varphi_{GNSS}$, a pitch angle $\theta_{GNSS}$, and an azimuth angle (yaw angle) $\psi V_{GNSS}$. The GNSS attitude angle calculating module 20 may output the GNSS attitude angle to the calibration value estimating module 30.

The magnetic sensor 40 may be fixed to the movable body. The magnetic sensor 40 may detect an external magnetism including a geomagnetism, and output a magnetic detection value [$m_{MAGx}$, $m_{MAGy}$] indicating components of two orthogonal axes to the calibration value estimating module 30 and the error correcting module 60.

The calibration value estimating module 30 may estimate a calibration value for each of a sensitivity error, a misalignment error, and a bias error which are included in the magnetic detection value [$m_{MAGx}$, $m_{MAGy}$] of the magnetic sensor 40, by using the GNSS attitude angle [$\varphi_{GNSS}$, $\theta_{GNSS}$, $\psi_{GNSS}$] and the magnetic detection value [$m_{MAGx}$, $m_{MAGy}$]. The calibration value estimating module 30 may estimate the calibration values using at least GNSS attitude angles and the magnetic detection values from three observations. In these three observations, the attitude of the movable body may be different.

Specifically, as illustrated in FIG. 1, the calibration value estimating module 30 may include the GNSS geomagnetism calculating submodule 301, the error estimating submodule 302, and the calibration value calculating submodule 303. The calibration value estimating module 30 may estimate the calibration values by executing the following processing. The GNSS geomagnetism calculating submodule 301 of the calibration value estimating module 30 may calculate the GNSS geomagnetism $[m_{GNSSx}, m_{GNSSy}]$ based on the GNSS attitude angle, from the GNSS attitude angle $[\varphi GNSS, \theta GNSS, \psi GNSS]$ by using the following Equations 1 and 2.

$$m_{GNSSx} = \cos \psi_{GNSS} \cdot \cos \theta_{GNSS} \quad (1)$$

$$m_{GNSSy} = -\sin \psi_{GNSS} \cdot \cos \varphi_{GNSS} \cdot \sin \theta_{GNSS} \cdot \sin \varphi_{GNSS} \quad (2)$$

The error estimating submodule 302 of the calibration value estimating module 30 may estimate the respective errors (the sensitive error, the misalignment error and the bias error) of the magnetic sensor by using the following Equation 3.

$$\begin{bmatrix} m_{MAGx} \\ m_{MAGy} \end{bmatrix} = \begin{bmatrix} m_{GNSSx} & m_{GNSSy} & 0 & 0 & 1 & 0 \\ 0 & 0 & m_{GNSSx} & m_{GNSSy} & 0 & 1 \end{bmatrix} \begin{bmatrix} \alpha_{xx} \\ \alpha_{xy} \\ \alpha_{yx} \\ \alpha_{yy} \\ \Delta m_x \\ \Delta m_y \end{bmatrix} \quad (3)$$

Here, $[\alpha_{xx}, \alpha_{yy}]$ may indicate a sensitivity error in the x-axis direction and the y-axis direction of the magnetic sensor 40. $[\alpha_{xy}, \alpha_{yx}]$ may indicate a misalignment error in the x-axis direction and the y-axis direction of the magnetic sensor 40. $[\Delta m_x, \Delta m_y]$ may indicate a bias error in the x-axis direction and the y-axis direction of the magnetic sensor 40.

The GNSS geomagnetism $[m_{GNSSx}, m_{GNSSy}]$ based on the GNSS attitude angle used in Equation 3 may be calculated by substituting the GNSS attitude angle $[\varphi_{GNSS}, \theta_{GNSS}, \psi_{GNSS}]$ which are observation values, into Equation 1 and Equation 2.

The calibration value calculating submodule 303 of the calibration value estimating module 30 may calculate, from the sensitivity error and the misalignment error estimated by Equation 3, a sensitivity/misalignment calibration matrix MM for the magnetic sensor 40 by using the following Equation 4.

$$MM = \begin{bmatrix} M_{xx} & M_{xy} \\ M_{yx} & M_{yy} \end{bmatrix} = \begin{bmatrix} \alpha_{xy} & \alpha_{xy} \\ \alpha_{yx} & \alpha_{yy} \end{bmatrix}^{-1} \quad (4)$$

Here, the calibration value calculating submodule 303 of the calibration value estimating module 30 may set the sensitivity/misalignment calibration matrix MM so as to include a conversion coefficient for setting the magnitude of the calibration value to "1" and a conversion coefficient for correcting a magnetic deviation.

The calibration value estimating module 30 may output the sensitivity/misalignment calibration matrix MM and the bias error $[\Delta m_x, \Delta m_y]$ as the calibration values, to the memory 50.

The memory 50 may store the calibration values, that is, the sensitivity/misalignment calibration matrix MM and the bias error $[\Delta m_x, \Delta m_y]$. Every time new calibration values are inputted, the memory 50 may overwrite the stored calibration values with new calibration values and store them.

The error correcting module 60 may acquire the calibration values from the memory 50. The error correcting module 60 may correct the magnetic detection value $[m_{MAGx}, m_{MAGy}]$ of the magnetic sensor 40 by the calibration values, using the following Equation 5.

$$\begin{bmatrix} m^b_{MAGx} \\ m^b_{MAGy} \end{bmatrix} = \begin{bmatrix} M_{xx} & M_{xy} \\ M_{yx} & M_{yy} \end{bmatrix} \begin{bmatrix} m_{MAGx} - \Delta m_x \\ m_{MAGy} - \Delta m_y \end{bmatrix} \quad (5)$$

$[m^b_{MAGx}, m^b_{MAGy}]$ may indicate the magnetic detection value after the error correction.

The error correcting module 60 may output the error-corrected magnetic detection value $[m^b_{MAGx}, m^b_{MAGy}]$, to the azimuth calculating module 70.

By using the error-corrected magnetic detection value $[m^b_{MAGx}, m^b_{MAGy}]$, the azimuth calculating module 70 may calculate the azimuth $\psi_{MAG}$ by a known method. To briefly explain, for example, the azimuth calculating module 70 may calculate an azimuth $\psi_{MAG}$ by using a ratio between the x-axis component $m^b_{MAGx}$ and the y-axis component $m^b_{MAGy}$ of the error-corrected detection value and a relationship of the x- and y-axes of the magnetic sensor 40 with a tip direction of the movable body (e.g., a heading of the ship).

As one specific example, when the magnetic sensor 40 is installed on the ship by having the positive direction of the magnetic sensor 40 coincide with the heading, the azimuth $\psi_{MAG}$ may be calculated using the following Equation 6.

$$\psi_{MAG} = \tan^{-1}\left(\frac{-m^b_{MAGy}}{m^b_{MAGx}}\right) \quad (6)$$

As described above, in the configuration of this embodiment, based on the GNSS attitude angle using the positioning signals of the GNSS which does not receive an influence of the sensitivity error, the misalignment error, and the bias error, the geomagnetism may be calculated and the sensitivity error, the misalignment error, and the bias error of the magnetic sensor 40 may be estimated from the geomagnetism which is based on the GNSS attitude angle and the magnetic detection values of the magnetic sensor 40. Therefore, the sensitivity error, the misalignment error, and the bias error of the magnetic sensor 40, that is, all error components constituting the error of the magnetic sensor 40 can be estimated with high accuracy. Here, since the error may be calculated from the GNSS attitude angles and the magnetic detection values of the magnetic sensor obtained in the three observations, the error included in the magnetic detection values of the magnetic sensor 40 can be calculated promptly.

Further, by using the magnetic detection value corrected using the error calculated with high accuracy in this manner, the azimuth can be calculated with high accuracy.

Note that, in calculating the GNSS geomagnetism $[m_{GNSSx}, m_{GNSSy}]$, when the roll angle $\varphi_{GNSS}$ and the pitch angle $\theta_{GNSS}$ of the GNSS attitude angle are small, a linear approximation may be possible, and Equation 1 and Equation 2 may be replaced by the following Equation 1' and Equation 2'.

$$m_{GNSSx} = \cos \psi_{GNSS} \quad (1')$$

$$m_{GNSSy} = -\sin \psi_{GNSS} \quad (2')$$

Figure 2:
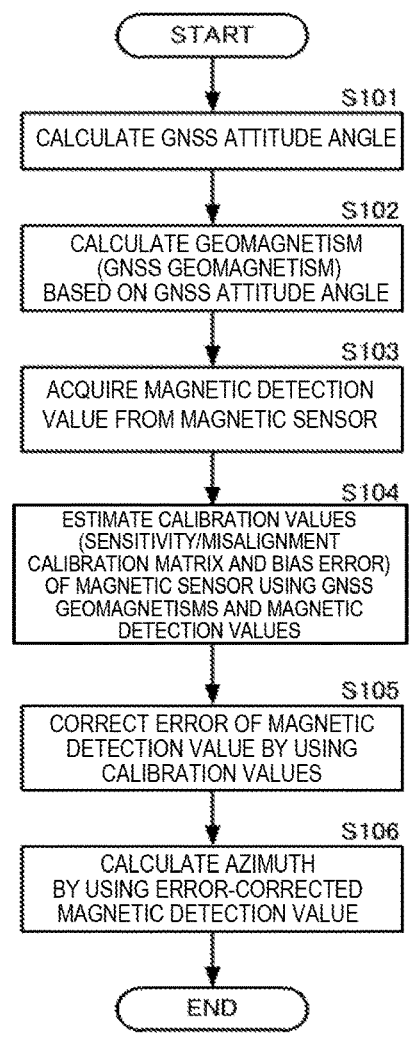
FIG. 2 is a flowchart of an attitude angle calculating method according to the first embodiment of the present disclosure.

As illustrated in FIG. 1, the attitude angle calculating apparatus 10 described above may execute each processing at an individual functional block. However, each processing of the error calculation and the azimuth calculation described above may be programmed and stored in a storage medium, and an information processing device, such as a computer, may read this program from the storage medium and execute it. In this case, the processing illustrated in FIG. 2 may be performed. FIG. 2 is a flowchart of an attitude angle calculating method according to the first embodiment of the present disclosure.

The information processing device may calculate the GNSS attitude angle by using the measurement values obtained by tracking the positioning signals of the GNSS (S101). The information processing device may calculate a GNSS geomagnetism based on the GNSS attitude angle, by using Equation 1 and Equation 2 (S102). The information processing device may acquire the magnetic detection value from the magnetic sensor (S103).

The information processing device may estimate the calibration values (the sensitivity/misalignment calibration matrix and the bias error) of the magnetic sensor using the GNSS geomagnetisms and the magnetic detection values from three observations, and Equation 3 (S104). The processing leading to this point may correspond to "sensor error calculating method" of the present disclosure.

The information processing device may correct the error of the magnetic detection value by using the calibration values and Equation 5 (S105). The information processing device may calculate the azimuth by using the error-corrected magnetic detection value (S106).

Figure 3:
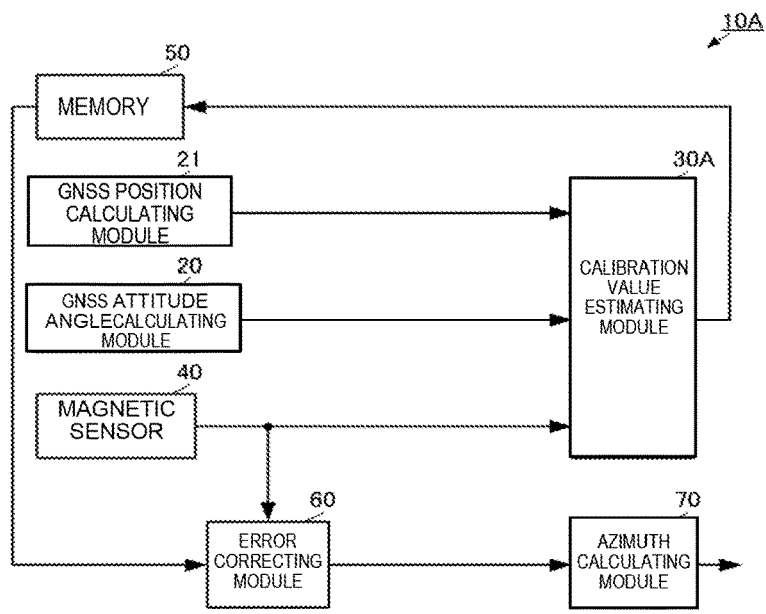
FIG. 3 is a functional block diagram of an attitude angle calculating apparatus according to a second embodiment of the present disclosure.

Next, a method and device for calculating a sensor error and a method and apparatus for calculating an attitude angle according to a second embodiment of the present disclosure will be described with reference to the drawings. FIG. 3 is a functional block diagram of the attitude angle calculating apparatus according to the second embodiment of the present disclosure.

Compared to the attitude angle calculating apparatus 10 according to the first embodiment, the attitude angle calculating apparatus 10A according to this embodiment may be configured by adding a GNSS position calculating module 21 and having processing of a calibration value estimating module 30A different from the calibration value estimating module 30.

The GNSS position calculating module 21 may be connected to GNSS receivers (not illustrated) to which the GNSS attitude angle calculating module 20 is connected. Code pseudoranges which are measurement values obtained by tracking the positioning signals and navigation messages may be inputted to the GNSS position calculating module 21.

The GNSS position calculating module 21 may calculate a GNSS position by a known method using the code pseudoranges and positional information of the positioning satellites included in the navigation messages. The GNSS position calculating module 21 may output the GNSS position to the calibration value estimating module 30A.

The calibration value estimating module 30A may calculate a latitude Lat based on the GNSS position. The calibration value estimating module 30A may calculate the GNSS geomagnetism $[m_{GNSSx}, m_{GNSSy}]$ based on the GNSS attitude angle, from the GNSS attitude angle $[\varphi_{GNSS}, \theta_{GNSS}, \psi_{GNSS}]$, by using the following Equation 7 and Equation 8.

$$m_{GNSSx} = \cos \psi_{GNSS} \cdot \cos \theta_{GNSS} + fx(\text{Lat}, \theta_{GNSS}) \quad (7)$$

$$m_{GNSSy} = -\sin \psi_{GNSS} \cdot \cos \phi_{GNSS} + \cos \psi_{GNSS} \cdot \sin \theta_{GNSS} \cdot \sin \phi_{GNSS} + fy(\text{Lat}, \theta_{GNSS}, \phi_{GNSS}) \quad (8)$$

Here, fx(Lat, OGNss) may be a motion correction term with respect to the x-axis direction of the GNSS geomagnetism as well as a function value determined by the latitude Lat and the pitch angle $\theta_{GNSS}$. Further, fy(Lat, $\theta_{GNSS}$, $\varphi_{GNSS}$) may be a motion correction term with respect to the y-axis direction of the GNSS geomagnetism as well as a function value determined by the latitude Lat, the pitch angle $\theta_{GNSS}$ and the roll angle $\varphi_{GNSS}$.

By applying to Equation 3 the GNSS geomagnetism $[m_{GNSSx}, m_{GNSSy}]$ calculated from Equation 7 and Equation 8, the calibration value estimating module 30A may estimate the sensitivity error $[\alpha_{xx}, \alpha_{yy}]$, the misalignment error $[\alpha_{xy}, \alpha_{yx}]$ and the bias error $[\Delta m_x, \Delta m_y]$, and calculate the calibration values.

By such a configuration and processing, the influence of the motion of the movable body (magnetic sensor), which is included in the sensitivity error $[\alpha_{xx}, \alpha_{yy}]$, the misalignment error $[\alpha_{xy}, \alpha_{yx}]$ and the bias error $[\Delta m_x, \Delta m_y]$, may be reduced. Thus, the sensitivity error $[\alpha_{xx}, \alpha_{yy}]$, the misalignment error $[\alpha_{xy}, \alpha_{yx}]$ and the bias error $[\Delta m_x, \Delta m_y]$ may be estimated more accurately, and highly accurate calibration values may be calculated. Further, by using the highly accurate calibration values, the azimuth may be calculated with high accuracy.

Figure 4:
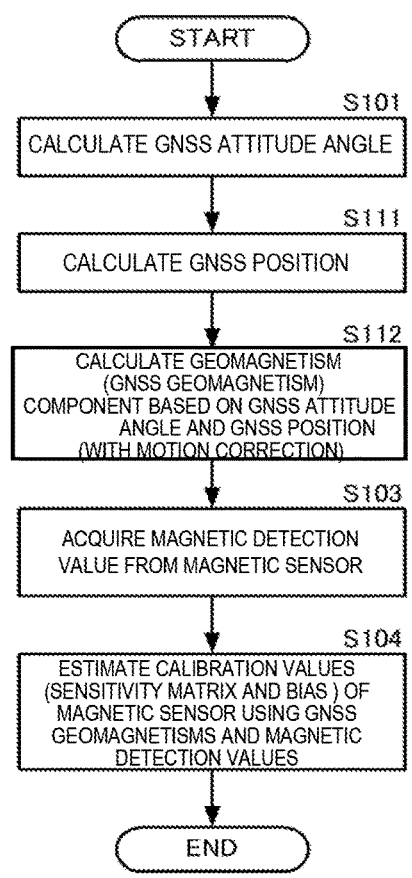
FIG. 4 is a flowchart of a sensor error calculating method according to the second embodiment of the present disclosure.

As illustrated in FIG. 3, the attitude angle calculating apparatus 10A described above may execute each processing at an individual functional block. However, each processing of the error calculation and the azimuth calculation described above may be programmed and stored in a storage medium, and an information processing device, such as a computer, may read this program from the storage medium and execute it. In this case, the processing illustrated in FIG. 4 may be performed. FIG. 4 is a flowchart of the sensor error calculating method according to the second embodiment of the present disclosure.

The information processing device may calculate the GNSS attitude angle by using the measurement values obtained by tracking the positioning signals of the GNSS (S101). The information processing device may calculate the GNSS position by using the measurement values obtained by tracking the positioning signals of the GNSS (S111). The information processing device may calculate the GNSS geomagnetism with the motion correction, based on the GNSS attitude angle by using Equation 7 and Equation 8 described above (S112). The information processing device may acquire the detection value (sensor value) from the magnetic sensor (S103).

The information processing device may estimate the calibration values (the sensitivity/misalignment calibration matrix and the bias error) of the magnetic sensor by using the GNSS geomagnetisms from three observations which are calculated in Equation 7 and Equation 8, the sensor value and Equation 3 (S104). Note that, the azimuth calculation processing may be the same as Steps S105 and S106 of the first embodiment illustrated in FIG. 2.

Figure 5:
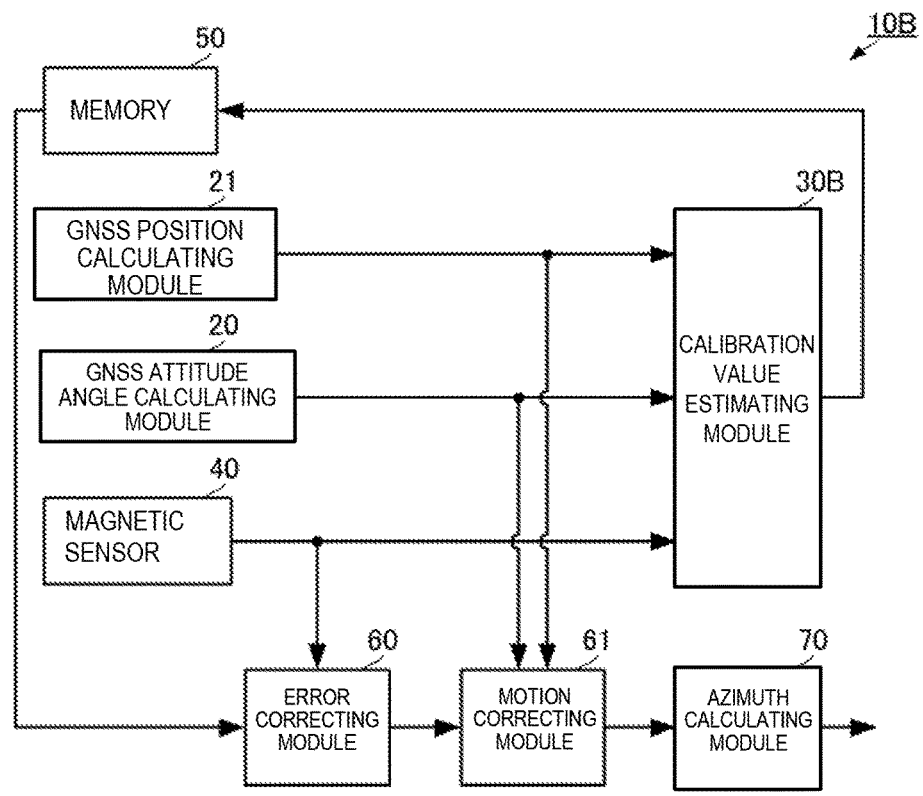
FIG. 5 is a functional block diagram of an attitude angle calculating apparatus according to a third embodiment of the present disclosure.

Next, a method and apparatus for calculating an attitude angle according to a third embodiment of the present disclosure is described with reference to the drawings. FIG. 5 is a functional block diagram of the attitude angle calculating apparatus according to the third embodiment of the present disclosure.

Compared to the attitude angle calculating apparatus 10A according to the second embodiment, the attitude angle calculating apparatus 10B according to this embodiment may be configured by adding a motion correcting module 61. A calibration value estimating module 30B may be the same as the calibration value estimating module 30A according to the second embodiment.

As illustrated in FIG. 5, the motion correcting module 61 may receive the GNSS attitude angle from the GNSS attitude angle calculating module 20. The motion correcting module 61 may receive the GNSS position from the GNSS position calculating module 21. The error-corrected magnetic detection value [$m^b_{MAGx}$, $m^b_{MAGy}$] may be inputted to the motion correcting module 61 from the error correcting module 60.

The motion correcting module 61 may calculate the latitude Lat based on the GNSS position. The motion correcting module 61 may perform a motion correction on the error-corrected magnetic detection value [$m^b_{MAGx}$, $m^b_{MAGy}$], by using the following Equation 9, the GNSS attitude angle [$\theta_{GNSS}$, $\theta_{nGNSS}$, $\psi_{GNSS}$], and the latitude Lat.

$$\begin{bmatrix} m^h_{MAGx} \\ m^h_{MAGy} \end{bmatrix} = \frac{1}{\cos\phi_{GNSS} \cdot \cos\theta_{GNSS}} \begin{bmatrix} \cos\phi_{GNSS} & 0 \\ -\sin\phi_{GNSS} \cdot \sin\theta_{GNSS} & \cos\theta_{GNSS} \end{bmatrix} \begin{bmatrix} m^b_{MAGx} - fx(Lat, \theta_{GNSS}) \\ m^b_{MAGy} - fy(Lat, \theta_{GNSS}, \phi_{GNSS}) \end{bmatrix} \quad (9)$$

[$m^b_{MAGx}$, $m^b_{MAGy}$] may indicate the detection value after the motion correction.

Note that, when the roll angle (pGNss and the pitch angle $\phi_{GNSS}$ of the GNSS attitude angle are in an angular range within which the linear approximation is possible, the motion-corrected magnetic detection values [$m^b_{MAGx}$, $m^b_{MAGy}$] may alternatively be calculated using Equation 10.

$$\begin{bmatrix} m^h_{MAGx} \\ m^h_{MAGy} \end{bmatrix} = \begin{bmatrix} m^b_{MAGx} - fx(Lat, \theta_{GNSS}) \\ m^b_{MAGy} - fy(Lat, \theta_{GNSS}, \phi_{GNSS}) \end{bmatrix} \quad (10)$$

The motion correcting module 61 may output the motion-corrected magnetic detection value [$m^b_{MAGx}$, $m^b_{MAGy}$], to the azimuth calculating module 70.

By using the motion-corrected magnetic detection value [$m^b_{MAGx}$, $m^b_{MAGy}$], the azimuth calculating module 70 may calculate the azimuth by a similar method to that in the first embodiment.

By using such a configuration, the influence of the motion of the movable body (magnetic sensor), which is included in the detection value of the magnetic sensor 40, may be reduced. Therefore, by using this configuration, a more accurate azimuth can be calculated.

Figure 6:
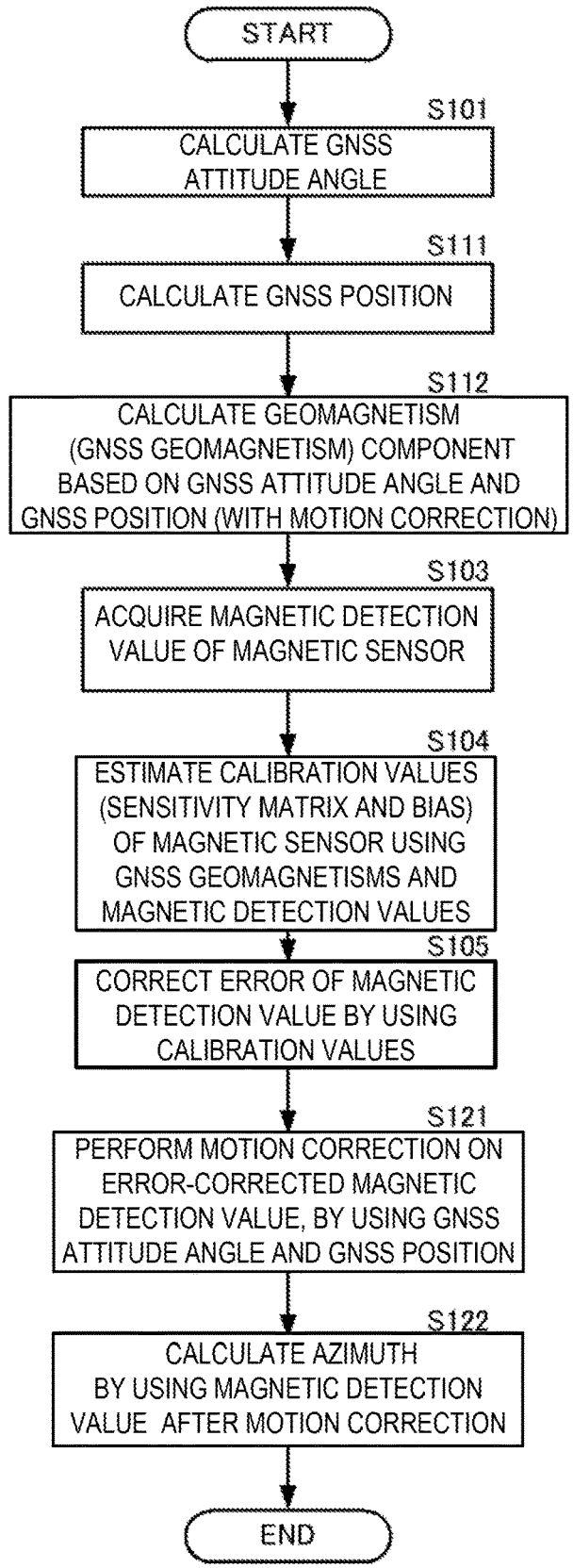
FIG. 6 is a flowchart of an attitude angle calculating method according to the third embodiment of the present disclosure.

As illustrated in FIG. 5, the attitude angle calculating apparatus 10B described above may execute each processing at an individual functional block. However, each processing of the error calculation and the azimuth calculation described above may be programmed and stored in a storage medium, and an information processing device, such as a computer, may read this program from the storage medium and execute it. In this case, the processing illustrated in FIG. 6 may be performed. FIG. 6 is a flowchart of the attitude angle calculating method according to the third embodiment of the present disclosure.

The information processing device may calculate the GNSS attitude angle by using the measurement values obtained by tracking the positioning signals of the GNSS (S101). The information processing device may calculate the GNSS position by using the measurement values obtained by tracking the positioning signals of the GNSS (S111). The information processing device may calculate a GNSS geomagnetism with the motion correction on the basis of the latitude, which is based on the GNSS position, and the GNSS attitude angle, by using Equation 7 and Equation 8 described above (S112). The information processing device may acquire the detection value (sensor value) from the magnetic sensor (S103).

The information processing device may estimate the calibration values (the sensitivity/misalignment calibration matrix and the bias error) of the magnetic sensor using the GNSS geomagnetisms from three observations which are calculated in Equation 7 and Equation 8, the sensor values and Equation 3 (S104).

The information processing device may correct the error of the sensor value by using the calibration values and Equation 5 (S105). The information processing device may perform the motion correction on the error-corrected sensor value, by using the GNSS attitude angle, the latitude, and Equation 10 (S121). The information processing device may calculate the azimuth by using the sensor value after the motion correction (S122).

Figure 7:
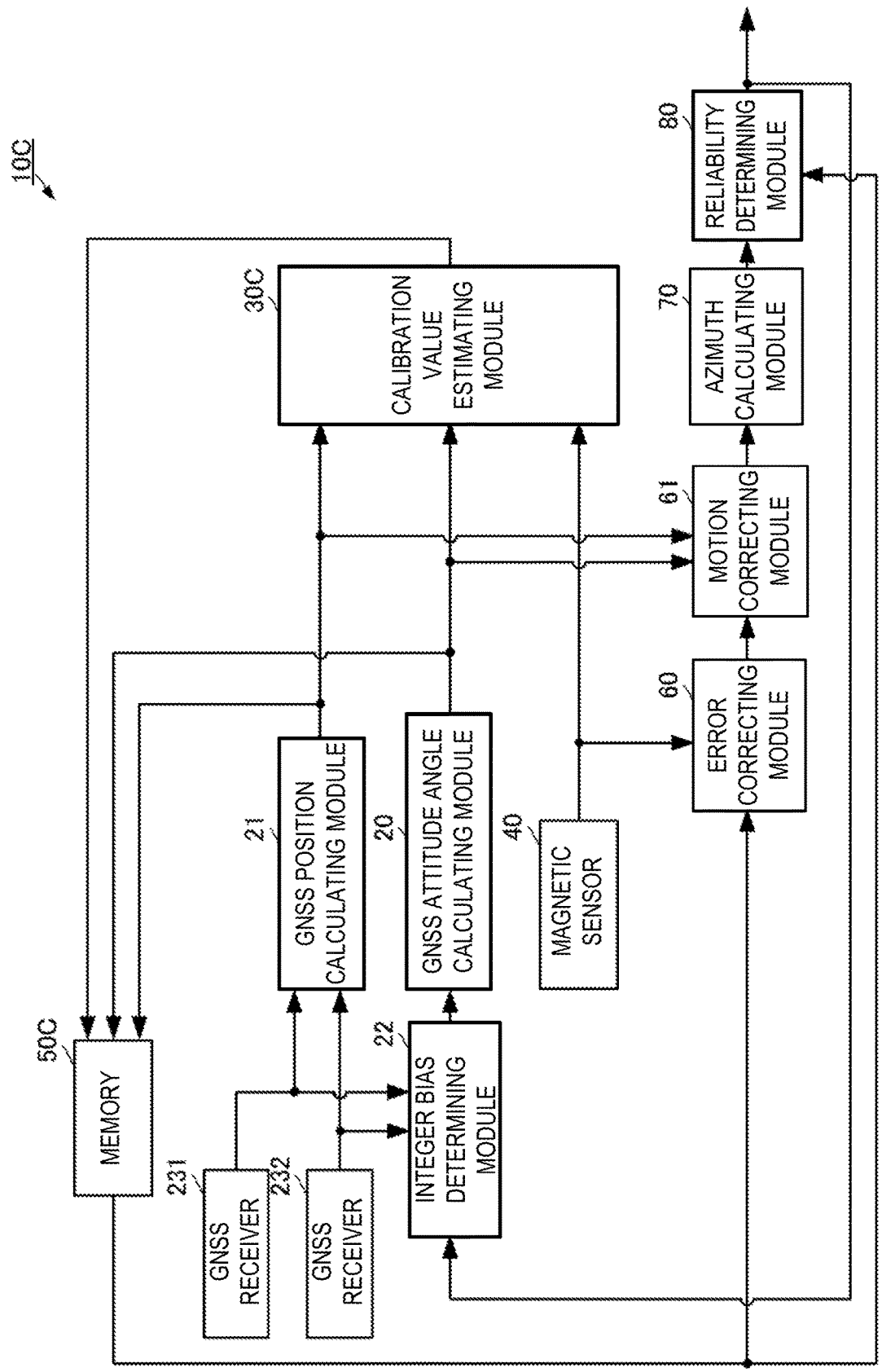
FIG. 7 is a functional block diagram of an attitude angle calculating apparatus according to a fourth embodiment of the present disclosure.

Next, a method and apparatus for calculating an attitude angle according to a fourth embodiment of the present disclosure is described with reference to the drawings. FIG. 7 is a functional block diagram of the attitude angle calculating apparatus according to the fourth embodiment of the present disclosure.

Compared to the attitude angle calculating apparatus 10B according to the third embodiment, the attitude angle calculating apparatus 10C according to this embodiment may be configured by adding an integer bias determining module 22 and a reliability determining module 80. Further, the attitude angle calculating apparatus 10C may include GNSS receivers 231 and 232 which are not illustrated for the attitude angle calculating apparatuses 10, 10A and 10B of the respective embodiments described above. A calibration value estimating module 30C may be the same as the calibration value estimating module 30B according to the third embodiment.

The GNSS receivers 231 and 232 may track the positioning signals received by the GNSS antennas connected thereto, respectively. The GNSS receivers 231 and 232 may output carrier phases and the code pseudoranges to the GNSS position calculating module 21. The GNSS receivers 231 and 232 may output the carrier phases to the integer bias determining module 22.

By using the azimuth $\psi_{MAG}$ outputted from the reliability determining module 80 which will be described later, the integer bias determining module 22 may determine an integer bias of a difference between the carrier phases of the positioning signals received by the GNSS receivers 231 and 232 (inter-antenna single phase difference). In this manner, the integer bias may easily be determined by using the azimuth. The integer bias determining module 22 may output the integer bias to the GNSS attitude angle calculating module 20 together with the carrier phases. The GNSS attitude angle calculating module 20 may calculate the GNSS attitude angle by using the integer bias and the carrier phases.

Note that, if the azimuth $\psi_{MAG}$ is not inputted from the reliability determining module 80 as described later (if the azimuth $\psi_{MAG}$ is not reliable), the integer bias determining module 22 may execute determination processing of the integer bias by a known GNSS.

A memory 50C may store, together with the calibration values, the GNSS position and the GNSS attitude angle. Note that, it may be sufficient that the memory 50C stores at least the azimuth $\psi_{GNSS}$ of the GNSS attitude angle together with the calibration values. The azimuth stored in the memory 50C may be a backup azimuth of this embodiment.

The reliability determining module 80 may acquire the backup azimuth from the memory 50C. The reliability determining module 80 may determine that the azimuth $\psi_{MAG}$ and the backup azimuth are reliable if the azimuth $\psi_{MAG}$ calculated by the azimuth calculating module 70 is determined to match the backup azimuth (the azimuth $\psi_{GNSS}$ of the GNSS attitude angle). On the other hand, the reliability determining module 80 may determine that the azimuth $\psi_{MAG}$ and the backup azimuth are not reliable if the azimuth $\psi_{MAG}$ calculated by the azimuth calculating module 70 is determined not to match the backup azimuth (the azimuth $\psi_{GNSS}$ of the GNSS attitude angle).

As a specific determining method, the reliability determining module 80 may calculate a difference $\Delta\psi$ between the azimuth $\psi_{MAG}$ and the backup azimuth (the azimuth $\psi_{GNSS}$ of the GNSS attitude angle), and if the difference $\Delta\psi$ is equal to or less than a threshold $\psi_{TH}$, it may determine that the azimuth $\psi_{MAG}$ matches the backup azimuth (the azimuth $\psi_{GNSS}$ of the GNSS attitude angle). On the other hand, if the difference $\Delta\psi$ is larger than the threshold $\psi_{TH}$, the reliability determining module 80 may determine that the azimuth $\psi_{MAG}$ does not match the backup azimuth (the azimuth $\psi_{GNSS}$ of the GNSS attitude angle). Note that, it may suffice that the threshold $\psi_{TH}$ is about 15° to 30°.

If determining that they are reliable, the reliability determining module 80 may output the azimuth $\psi_{MAG}$ to an outside thereof and to the integer bias determining module 22. On the other hand, if determining that they are not reliable, the reliability determining module 80 may refrain from outputting the azimuth $\psi_{MAG}$. Here, the reliability determining module 80 may notify whether they are reliable, to the outside via a notifying unit (a display unit, a sound emitting unit, etc. which are not illustrated).

By using such a configuration, the azimuth with high reliability alone may be provided to a user. Further, since the integer bias is determined using only the highly reliable azimuth, an initial calculation of the GNSS attitude angle may accurately and rapidly be performed.

Figure 8:
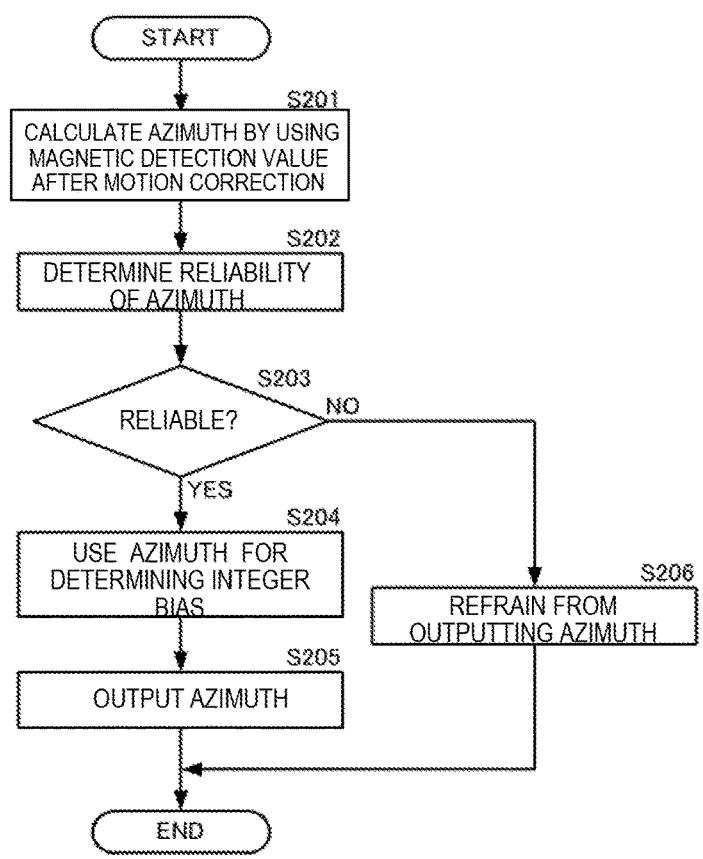
FIG. 8 is a flowchart of processing relating to a reliability determination in an attitude angle calculating method according to the fourth embodiment of the present disclosure.

The reliability determining module 80 of the attitude angle calculating apparatus 10C described above may perform processing illustrated in FIGS. 8 and 9 as one example of specific processing. FIG. 8 is a flowchart of processing relating to a reliability determination in the attitude angle calculating method according to the fourth embodiment of the present disclosure.

As illustrated in FIG. 8, the azimuth calculating module 70 may calculate the azimuth $\psi_{MAG}$ by using the sensor value after the motion correction (S201). The reliability determining module 80 may determine the reliability of the azimuth $\psi_{MAG}$ (S202). If determining that they are reliable (S203: YES), the reliability determining module 80 may use the azimuth $\psi_{MAG}$ for determining the integer bias (S204), and also output the azimuth $\psi_{MAG}$ to the outside (S205). If determining that they are not reliable (S203: NO), the reliability determining module 80 may refrain from outputting the azimuth $\psi_{MAG}$ (S206).

Figure 9:
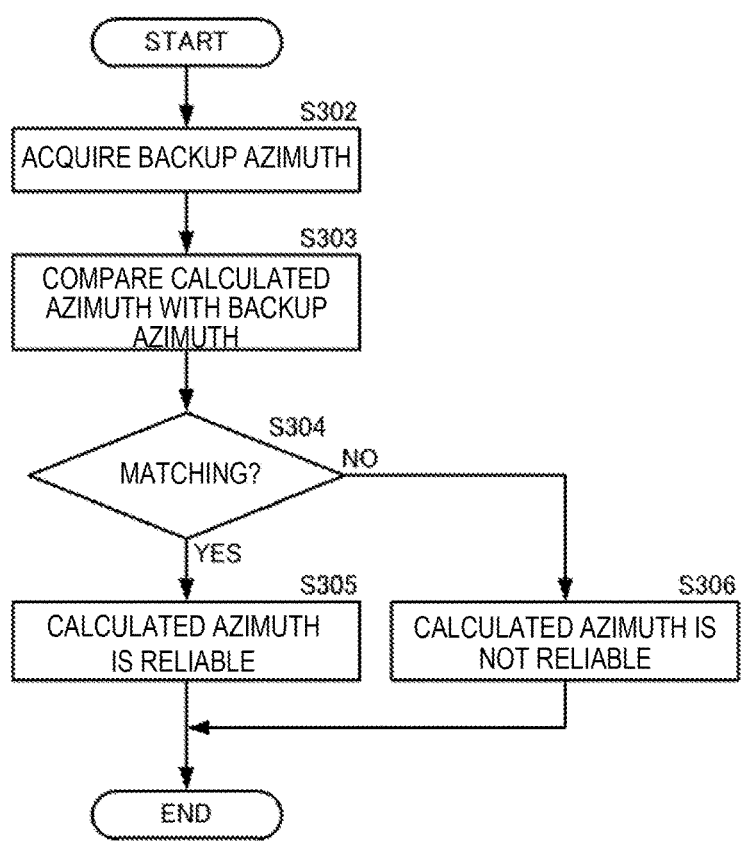
FIG. 9 is a flowchart of specific processing of a reliability determination in attitude angle calculation processing according to the fourth embodiment of the present disclosure.

FIG. 9 is a flowchart of specific processing of a reliability determination in attitude angle calculation processing according to the fourth embodiment of the present disclosure.

As illustrated in FIG. 9, the reliability determining module 80 may acquire the backup azimuth from the memory 50C (S302). The reliability determining module 80 may compare the azimuth $\psi_{MAG}$ calculated by the azimuth calculating module 70 with the backup azimuth (S303).

If the azimuth $\psi_{MAG}$ matches the backup azimuth (S304: YES), the reliability determining module 80 may determine that the azimuth $\psi_{MAG}$ and the backup azimuth are reliable (S305). Here, the state where the azimuth $\psi_{MAG}$ matches the backup azimuth may mean that the difference $\Delta\psi$ between the azimuth $\psi_{MAG}$ and the backup azimuth is equal to or less than the threshold $\psi_{TH}$.

If the azimuth $\psi_{MAG}$ does not match the backup azimuth (S304: NO), the reliability determining module 80 may determine that the azimuth $\psi_{MAG}$ and the backup azimuth are not reliable (S306).

Figure 10:
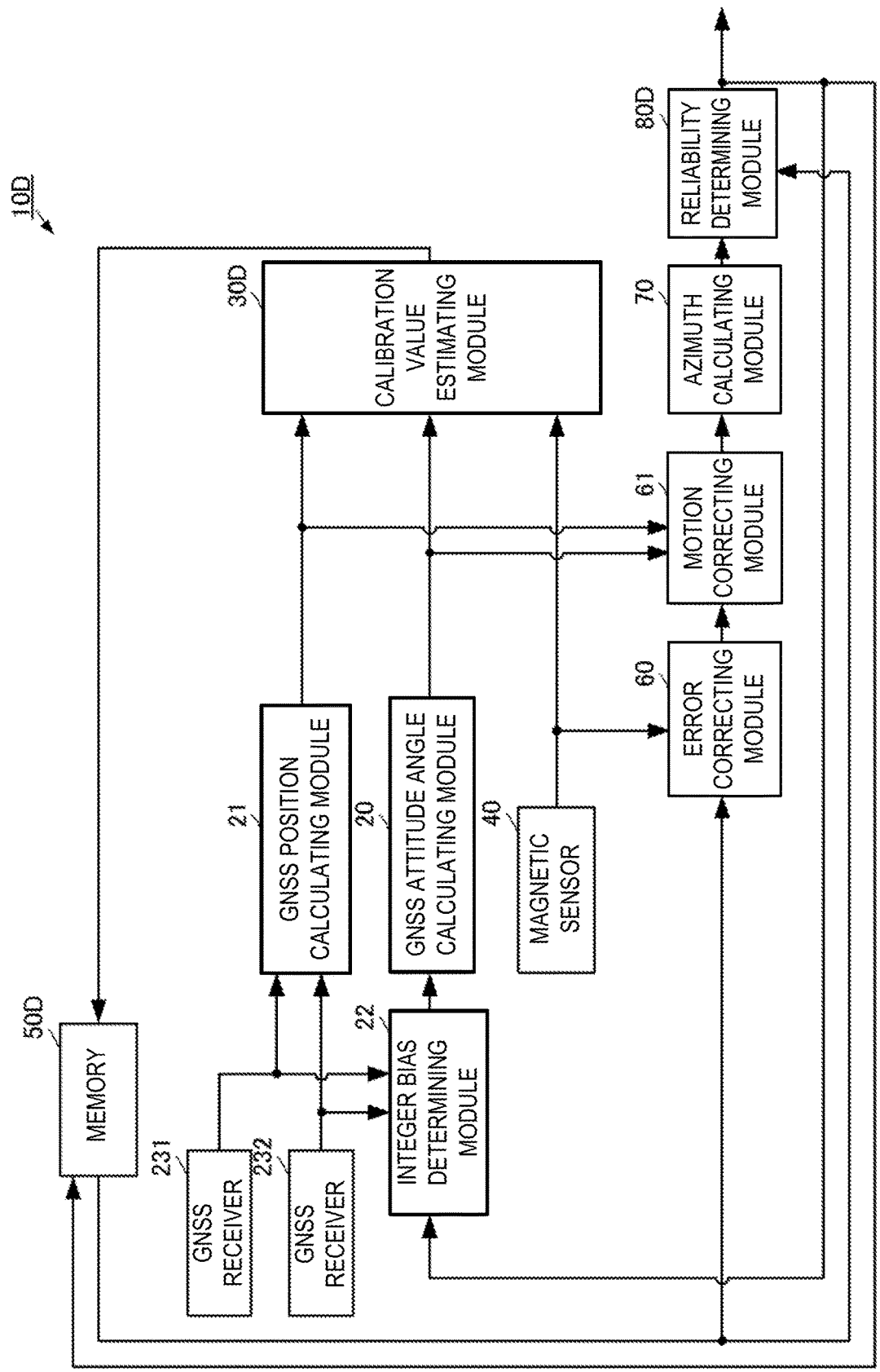
FIG. 10 is a functional block diagram of an attitude angle calculating apparatus according to a fifth embodiment of the present disclosure.

Next, a method and apparatus for calculating an attitude angle according to a fifth embodiment of the present disclosure is described with reference to the drawing. FIG. 10 is a functional block diagram of the attitude angle calculating apparatus according to the fifth embodiment of the present disclosure.

The attitude angle calculating apparatus 10D according to this embodiment may be different from the attitude angle calculating apparatus 10C according to the fourth embodiment in a memory 50D and a reliability determining module 80D. A calibration value estimating module 30D may be the same as the calibration value estimating module 30C according to the fourth embodiment.

The memory 50D may store, together with the calibration value, the azimuth $\psi_{MAG}$ outputted from the reliability determining module 80D as the backup azimuth. The reliability determining module 80D may determine reliability by comparing the azimuth $\psi_{MAG}$ calculated by the azimuth calculating module 70 with the backup azimuth. The backup azimuth used here may be the azimuth $\psi_{MAG}$ which is previously calculated, stored in the memory 50D.

By using such a configuration, the reliability of the azimuth may be determined even in an environment in which the GNSS attitude angle cannot be calculated.

Figure 11:
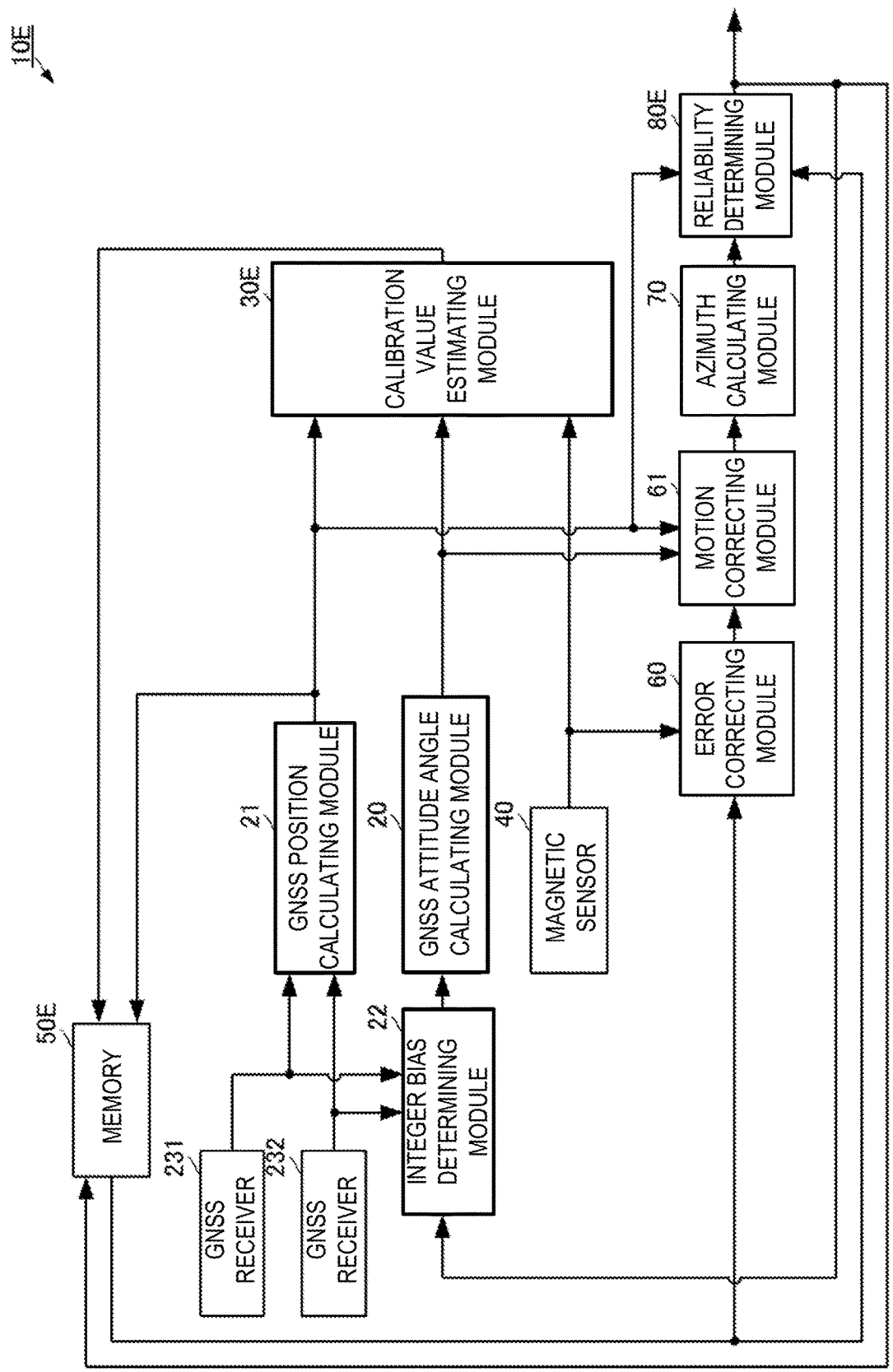
FIG. 11 is a functional block diagram of an attitude angle calculating apparatus according to a sixth embodiment of the present disclosure.

Next, a method and apparatus for calculating an attitude angle according to a sixth embodiment of the present disclosure is described with reference to the drawings. FIG. 11 is a functional block diagram of the attitude angle calculating apparatus according to the sixth embodiment of the present disclosure.

The attitude angle calculating apparatus 10E according to this embodiment may be different from the attitude angle calculating apparatus 10D according to the fifth embodiment in a reliability determining module 80E. A calibration value estimating module 30E may be the same as the calibration value estimating module 30D according to the fifth embodiment, and a memory 50E may be the memory 50D according to the fifth embodiment with an additional function for storing the GNSS position as the backup position.

Figure 12:
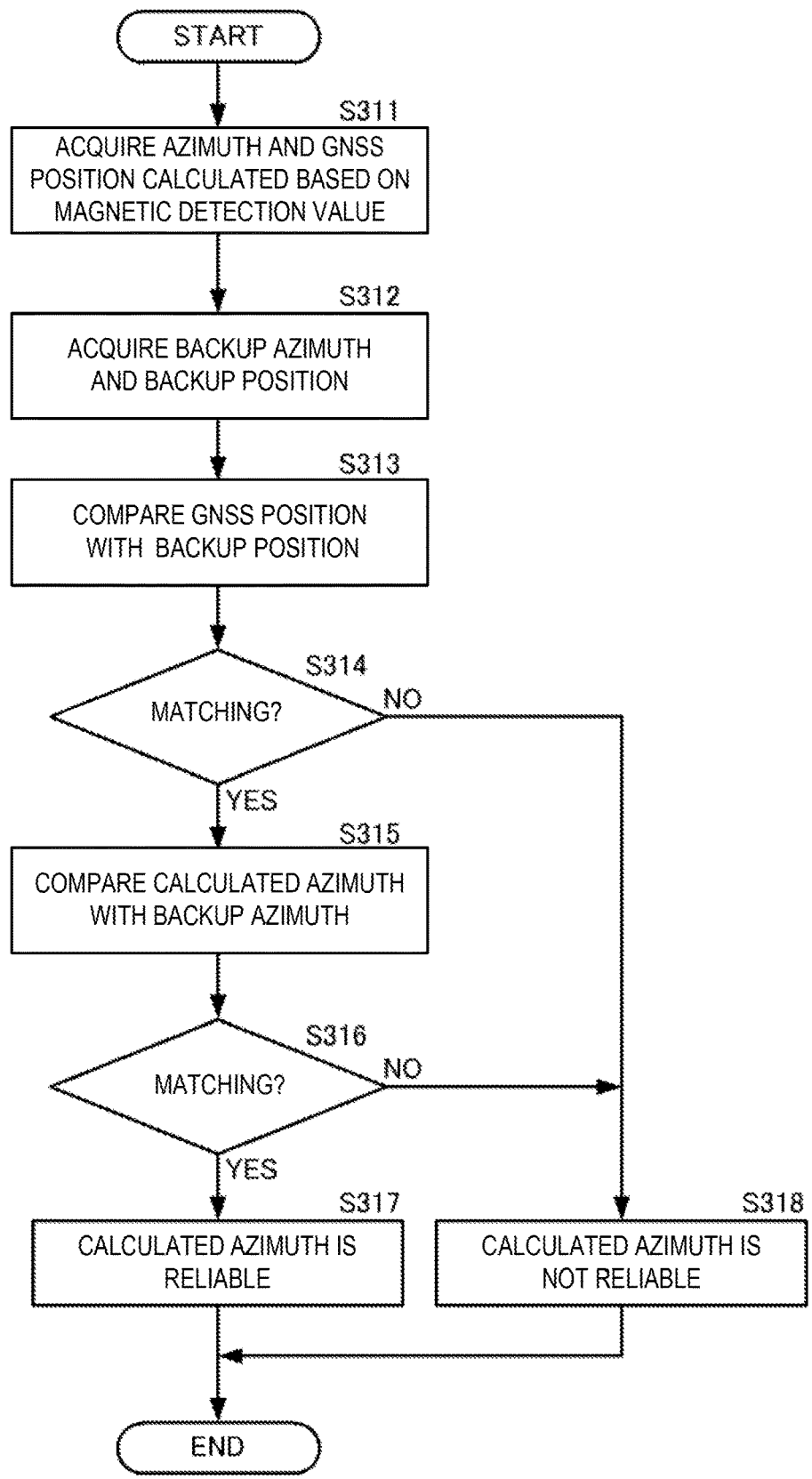
FIG. 12 is a flowchart of a reliability determination in attitude angle calculation processing according to the sixth embodiment of the present disclosure.

The reliability determining module 80E may determine the reliability by executing the following processing. FIG. 12 is a flowchart of a reliability determination in attitude angle calculation processing according to the sixth embodiment of the present disclosure.

The reliability determining module 80E may acquire the azimuth $\psi_{MAG}$ calculated by the azimuth calculating module 70 and the GNSS position calculated by the GNSS position calculating module 21 (S311). The reliability determining module 80E may acquire the backup azimuth and the backup position from the memory 50E (S312).

The reliability determining module 80E may compare the GNSS position with the backup position (S313). If the GNSS position and the backup position match (S314: YES), the reliability determining module 80E may proceed to the processing of Step S315. For example, when the difference between the GNSS position and the backup position (the difference in coordinates in each axis direction) is equal to or less than the threshold, the reliability determining module 80E may determine that the GNSS position and the backup position match with each other. If the GNSS position and the backup position do not match with each other (S314: NO), the reliability determining module 80E may determine that the calculated azimuth $\psi_{MAG}$ is not reliable (S318). For example, when the difference between the GNSS position and the backup position (the difference in coordinates in each axis direction) is larger than the threshold, the reliability determining module 80E may determine that the GNSS position and the backup position do not match with each other.

The reliability determining module 80E may compare the azimuth $\psi_{MAG}$ with the backup azimuth (S315). If the azimuth $\psi_{MAG}$ matches the backup azimuth (S316: YES), the reliability determining module 80E may determine that the calculated azimuth $\psi_{MAG}$ is reliable (S317). If the azimuth $\psi_{MAG}$ does not match the backup azimuth (S316: NO), the reliability determining module 80E may determine that the calculated azimuth $\psi_{MAG}$ is not reliable (S318). The determination as to whether the azimuth $\psi_{MAG}$ matches the backup azimuth may be performed by using a similar method to that in the above embodiment.

By using such a configuration and processing, the reliability of the azimuth $\psi_{MAG}$, including the position, may be determined. For example, in a case where the GNSS position (corresponding to the current position) is greatly different from the backup position (corresponding to a previous position), unless on substantially the same longitude, the azimuth may obviously vary as well. Therefore, in such a case, it may be clear even without comparing the azimuth that the reliability of the azimuth cannot be said to be high, and the reliability of the azimuth may easily be determined.

Figure 13:
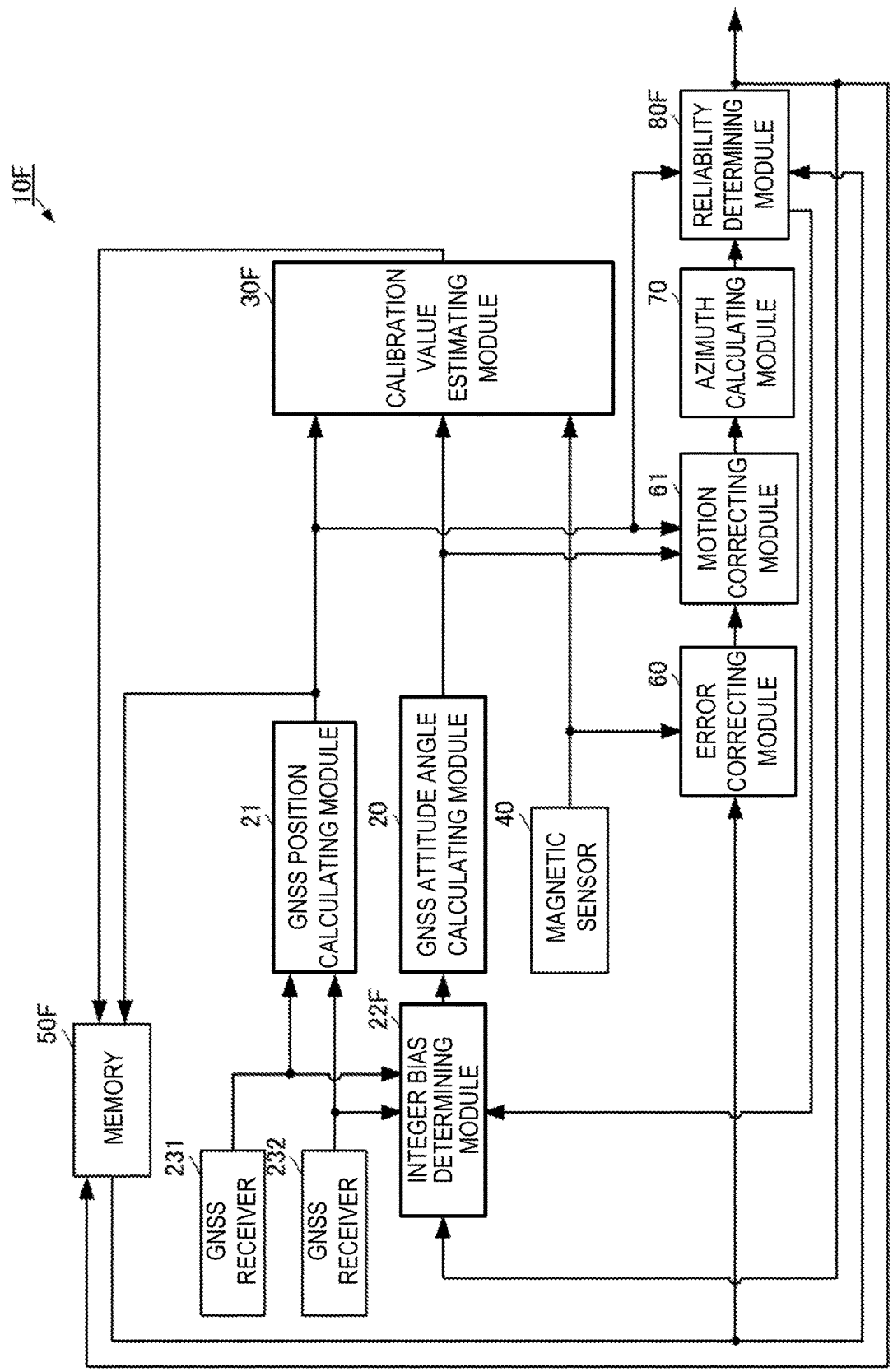
FIG. 13 is a functional block diagram of an attitude angle calculating apparatus according to a seventh embodiment of the present disclosure.

Next, a method and apparatus for calculating an attitude angle according to a seventh embodiment of the present disclosure is described with reference to the drawing. FIG. 13 is a functional block diagram of the attitude angle calculating apparatus according to the seventh embodiment of the present disclosure.

The attitude angle calculating apparatus 10F according to this embodiment may be different from the attitude angle calculating apparatus 10E according to the sixth embodiment in processing in which the azimuth is used for the calculation of the integer bias. A calibration value estimating module 30F and a memory 50F may be the same as the calibration value estimating module 30E and the memory 50E of the attitude angle calculating apparatus 10E according to the sixth embodiment.

A reliability determining module 80F may output the azimuth $\psi_{MAG}$ and output the reliability of the azimuth $\psi_{MAG}$. The integer bias determining module 22F may use $\psi_{MAG}$ for determining the integer bias if the azimuth WMAG for determining the integer bias if the azimuth $\psi_{MAG}$ is reliable. The integer bias determining module 22F may execute the determination processing of the integer bias by a known GNSS if the azimuth $\psi_{MAG}$ is not reliable.

Thus, even in a mode where the azimuth is always outputted, since the integer bias is determined using only the reliable azimuth, the integer bias may be determined accurately and promptly.

Figure 14:
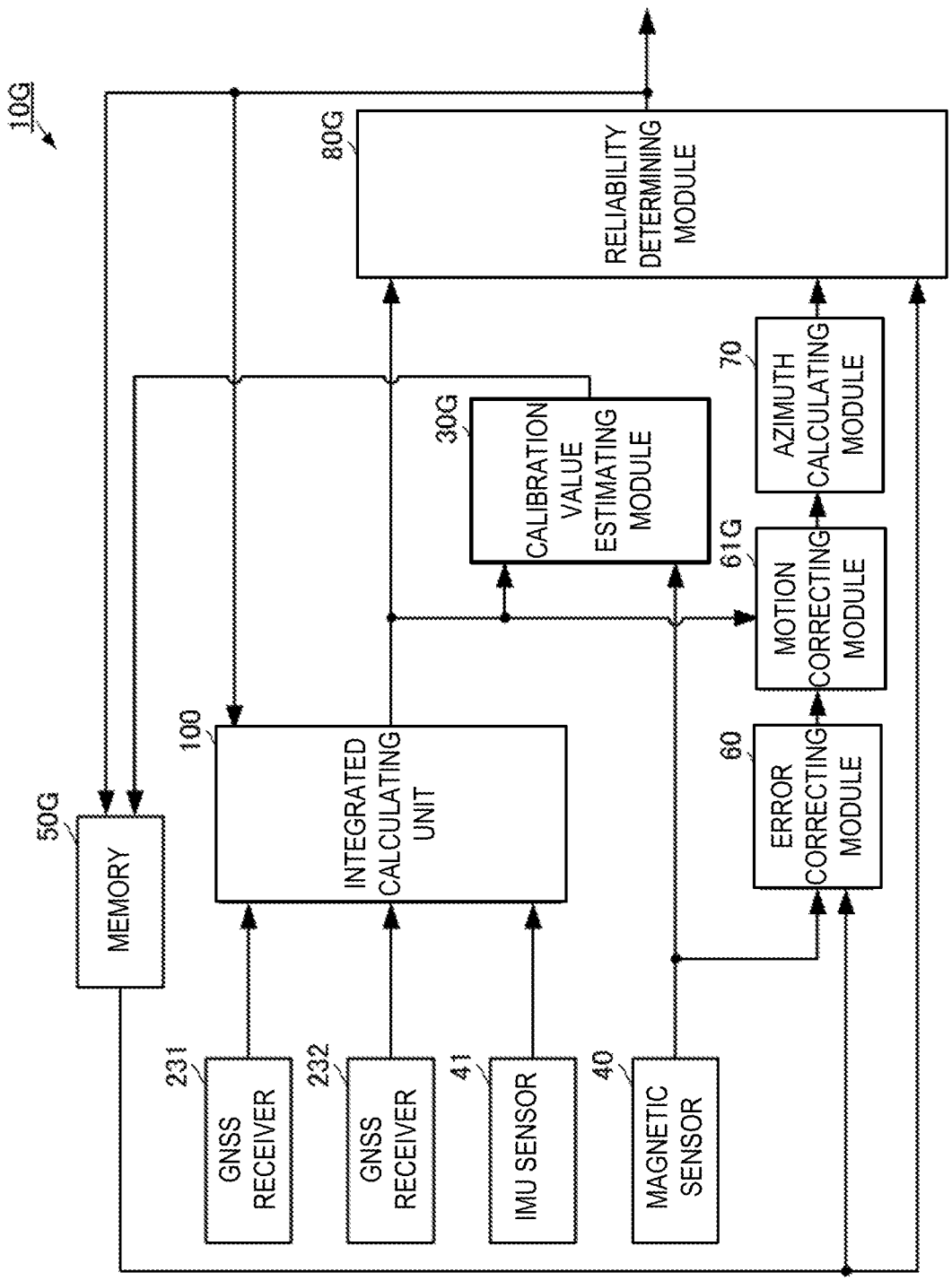
FIG. 14 is a functional block diagram of an attitude angle calculating apparatus according to an eighth embodiment of the present disclosure.

Next, a method and apparatus for calculating an attitude angle according to an eighth embodiment of the present disclosure is described with reference to the drawings. FIG. 14 is a functional block diagram of the attitude angle calculating apparatus according to the eighth embodiment of the present disclosure.

An attitude angle calculating apparatus 10G according to this embodiment may be different from the attitude angle calculating apparatus 10C according to the fourth embodiment in that an integrated attitude angle is used instead of the GNSS attitude angle. The basic processing of the attitude angle calculating apparatus 10G may be the same as the attitude angle calculating apparatus 10C according to the fourth embodiment of the present disclosure, and different points will be described in detail below.

The integrated attitude angle may be an attitude angle calculated using the measurement values, such as the carrier phases obtained by the positioning signals, and an IMU sensor measurement value measured by an IMU sensor 41.

The attitude angle calculating apparatus 10G may include an integrated calculating unit 100, GNSS receivers 231 and 232, a calibration value estimating module 30G a magnetic sensor 40, the IMU sensor 41, a memory 50G, an error correcting module 60, a motion correcting module 61G; an azimuth calculating module 70, and a reliability determining module 80G

The GNSS receivers 231 and 232 may track the positioning signals and output measurement values obtained by the tracking, such as the carrier phases, to the integrated calculating unit 100.

The IMU sensor 41 may include at least one of inertial sensors, such as an acceleration sensor and an angular velocity sensor. The IMU sensor 41 may output a measured sensor value (IMU sensor value) to the integrated calculating unit 100.

The integrated calculating unit 100 may calculate the integrated attitude angle by a known method using the measured values obtained by the tracking and the IMU sensor value. The integrated calculating unit 100 may output the integrated attitude angle to the calibration value estimating module 30G and the reliability determining module 80G The integrated calculating unit 100 may calculate an integrated position by a known method using the measurement values obtained by the tracking. The integrated calculating unit 100 may output the integrated position to the memory 50G and the reliability determining module 80G The memory 50G may store the integrated position as a backup position.

The magnetic sensor 40 may output the magnetic detection value to the calibration value estimating module 30G and the error correcting module 60.

The calibration value estimating module 30G may calculate a geomagnetism from the integrated attitude angle, estimate the sensitivity error, the misalignment error, and the bias error of the magnetic sensor 40 by using the geomagnetism obtained based on the integrated attitude angle and the detection value of the magnetic sensor, and calculate the calibration value. The calibration value estimating module 30G may output the calibration values to the memory 50G

The error correcting module 60 may acquire the calibration values from the memory 50G and correct the detection value of the magnetic sensor by using the calibration values. The motion correcting module 61G may perform a motion correction on the error-corrected detection value of the magnetic sensor, by using the integrated attitude angle. The azimuth calculating module 70 may calculate the azimuth by using the motion-corrected detection value of the magnetic sensor.

The reliability determining module 80G may determine the reliability of the azimuth calculated using the detection value of the magnetic sensor, by using the backup azimuth acquired from the memory 50G Here, similarly to the case of using the GNSS position described in the above embodiment, the integrated position may be used. Furthermore, an integrated speed based on the integrated position may alternatively be used. If the azimuth is reliable, the reliability determining module 80G may output the azimuth to the outside as well as to the memory 50G and the integrated calculating unit 100. The memory 50G may store this azimuth as a backup azimuth. The integrated calculating unit 100 may determine an integer bias using this azimuth.

Figure 15:
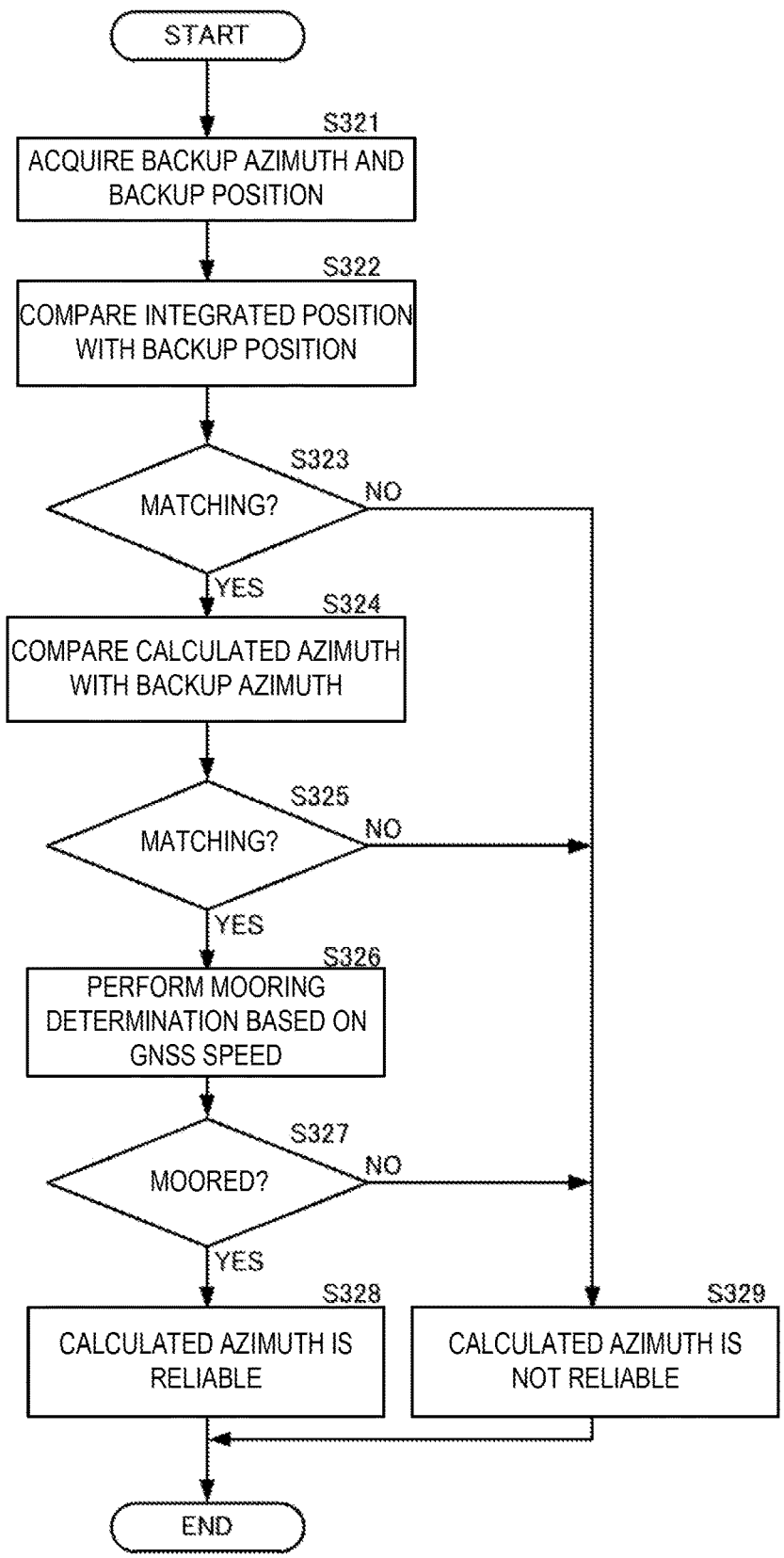
FIG. 15 is a flowchart of a reliability determination in an attitude angle calculating method according to the eighth embodiment of the present disclosure.

FIG. 15 is a flowchart of a reliability determination in the attitude angle calculating method according to the eighth embodiment of the present disclosure.

The reliability determining module 80G may acquire the integrated position calculated by the integrated calculating unit 100, and the backup position and backup azimuth stored in the memory 50G (S321).

The reliability determining module 80G may compare the integrated position with the backup position (S322). If the integrated position and backup position match (S323: YES), the reliability determining module 80G may proceed to the processing of Step S324. If the integrated position does not match the backup position (S323: NO), the reliability determining module 80G may determine that the calculated azimuth $\psi_{MAG}$ is not reliable (S329).

The reliability determining module 80G may compare the azimuth $\psi_{MAG}$ with the backup azimuth (S324). If the azimuth $\psi_{MAG}$ and backup azimuth match (S325: YES), the reliability determining module 80G may proceed to the processing of Step S326. If the azimuth $\psi_{MAG}$ does not match the backup azimuth (S325: NO), the reliability determining module 80G may determine that the calculated azimuth $\psi_{MAG}$ is not reliable (S329).

The reliability determining module 80G may calculate a GNSS speed based on the GNSS positions at a plurality of time points and perform an mooring determination based on the GNSS speed (S326). If the GNSS speed is substantially "0," the reliability determining module 80G may determine that the ship is moored, and if the GNSS speed is not substantially "0," the reliability determining module 80G may determine that the ship is not moored. Note that, the speed may alternatively be acquired by another method. For example, an integrated value of acceleration etc. may alternatively be used.

If it is moored (S327: YES), the reliability determining module 80G may determine that the calculated azimuth $\psi_{MAG}$ is reliable (S328). If it is not moored (S327: NO), the reliability determining module 80G may determine that the calculated azimuth $\psi_{MAG}$ is not reliable (S318).

Note that, the integrated attitude angle and the integrated position described in this embodiment may also be used in replacement of the GNSS attitude angle and the GNSS position in another embodiment.

Figure 16:
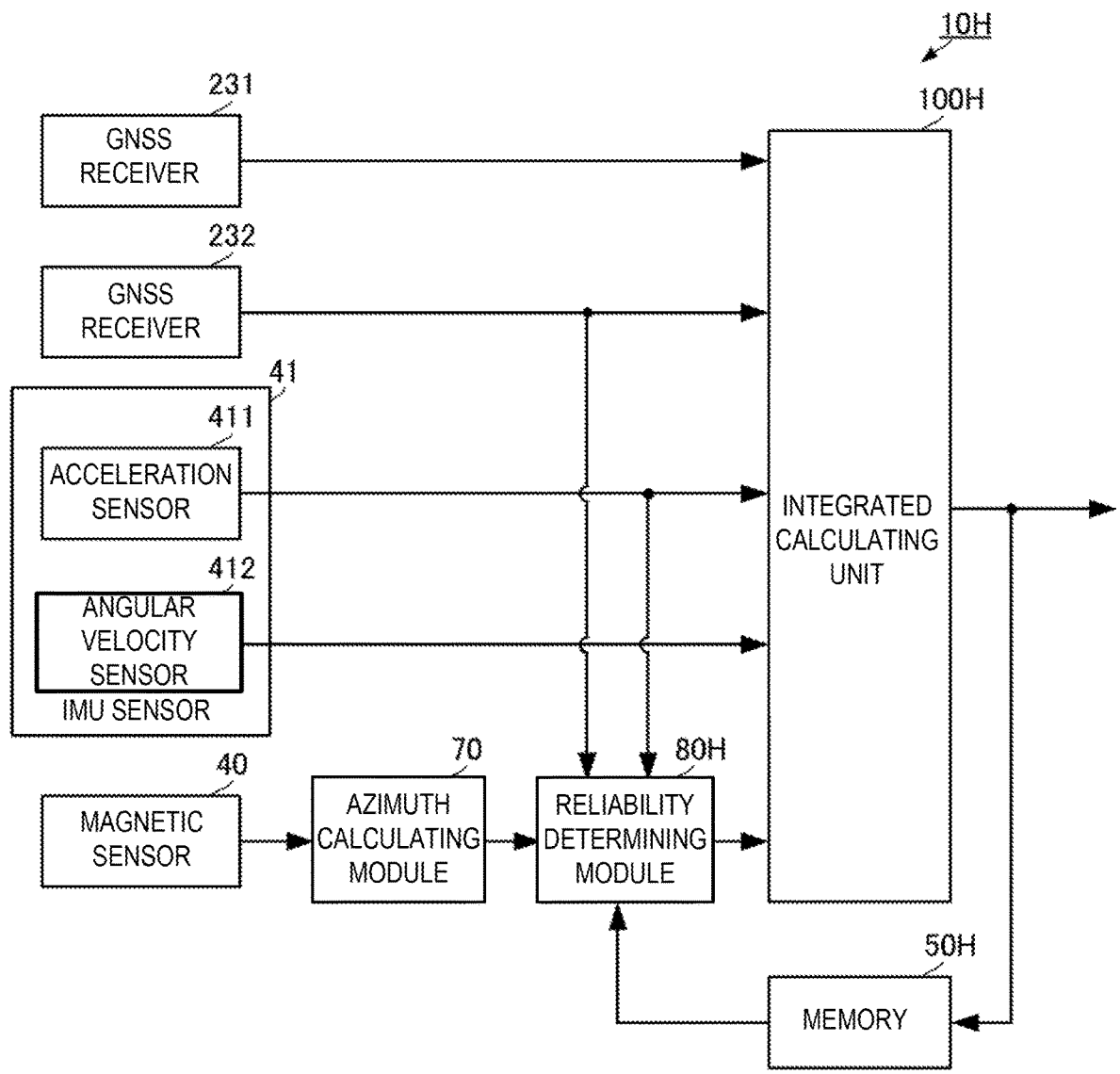
FIG. 16 is a functional block diagram of an attitude angle calculating apparatus according to a ninth embodiment of the present disclosure.

Next, a method and apparatus for calculating an attitude angle according to a ninth embodiment of the present disclosure is described with reference to the drawing. FIG. 16 is a functional block diagram of the attitude angle calculating apparatus according to the ninth embodiment of the present disclosure.

The attitude angle calculating apparatus 10H according to this embodiment may only perform the reliability determination without estimating the calibration values described in each of the embodiments described above. Further, the attitude angle calculating apparatus 10H may use the azimuth obtained by the magnetic sensor, as the integrated attitude angle.

The attitude angle calculating apparatus 10H may include an integrated calculating unit 100H, GNSS receivers 231 and 232, a magnetic sensor 40, an IMU sensor 41, a memory 50H, an azimuth calculating module 70, and a reliability determining module 80H.

The GNSS receivers 231 and 232 may track the positioning signals, output measurement values obtained by the tracking, such as the carrier phases, to the integrated calculating unit 100H. The GNSS receiver 232 may output the measurement values obtained by the tracking, to the reliability determining module 80G The IMU sensor 41 may include an acceleration sensor 411 and an angular velocity sensor 412. The acceleration sensor 411 and the angular velocity sensor 412 may output the measured sensor values (acceleration sensor value and angular velocity sensor value) to the integrated calculating unit 100H. The acceleration sensor 411 may output the acceleration sensor value to the reliability determining module 80H.

The integrated calculating unit 100H may calculate the integrated attitude angle by a known method using the measured value obtained by the tracking, the acceleration sensor value, the angular velocity sensor value, and the azimuth based on the detection value of the magnetic sensor. The integrated calculating unit 100H may calculate an integrated position by a known method using the measurement values obtained by the tracking. The integrated calculating unit 100H may output the integrated attitude angle and the integrated position to the memory 50H. The memory 50H may store the integrated position and the integrated attitude angle as a backup position and a backup attitude angle, respectively.

The magnetic sensor 40 may output the detection value of the magnetic sensor to the azimuth calculating module 70. The azimuth calculating module 70 may calculate the azimuth by using the detection value of the magnetic sensor.

The reliability determining module 80H may determine the reliability of the azimuth calculated using the detection value of the magnetic sensor, by using the backup azimuth acquired from the memory 50H. Here, the reliability determining module 80H may alternatively calculate the GNSS position by using the measurement values obtained by the tracking, obtained from the GNSS receiver 232, and use this GNSS position for the reliability determination. As the reliability determining method, any of the methods described in the embodiments described above may be used. If the calculated azimuth is reliable, the reliability determining module 80H may output the azimuth to the integrated calculating unit 100H. The integrated calculating unit 100H may use the azimuth based on the magnetic detection value, for an initial azimuth etc. for determining the integer bias. As a result, the integrated attitude angle may be calculated more promptly.

DESCRIPTION OF REFERENCE CHARACTERS

1: Sensor Error Calculating Device
10, 10A, 10B, 10C, 10D, 10E, 10F, 10G, 10H: Attitude Angle Calculating Apparatus
11: Hardware Processor
20: GNSS Attitude Angle Calculating Module
21: GNSS Position Calculating Module
22, 22F: Integer Bias Determining Module
30, 30A, 30B, 30C, 30D, 30E, 30F, 30G: Calibration Value Estimating Module
40: Magnetic Sensor
41: IMU Sensor
50, 50C, 50D, 50E, 50F, 50G, 50H: Memory
60: Error Correcting Module
61, 61G: Motion Correcting Module
70: Azimuth Calculating Module
80, 80D, 80E, 80F, 80Q 80H: Reliability Determining Module
100, 100H: Integrated Calculating Module
231, 232: GNSS Receiver
301: GNSS Geomagnetism Calculating Submodule
302: Error Estimating Submodule
303: Calibration Value Calculating Submodule
411: Acceleration Sensor
412: Angular Velocity Sensor

What is claimed is:

1. An attitude angle calculating apparatus, comprising:
a sensor error calculating device comprising:
processing circuitry configured to:
calculate a GNSS attitude angle based on positioning signals of a GNSS,
calculate a GNSS geomagnetism based on the GNSS attitude angle, and
estimate a sensitivity error, a misalignment error and a bias error of a magnetic sensor by using a magnetic detection value of the magnetic sensor and the GNSS geomagnetism, wherein
the processing circuitry is further configured to:
correct the magnetic detection value by using the sensitivity error, the misalignment error and the bias error of the magnetic sensor,
calculate an azimuth by using the error-corrected magnetic detection value,
calculate a backup azimuth by using the GNSS attitude angle,
determine a reliability of the azimuth by using the azimuth and the backup azimuth,
determine that, when the azimuth is substantially equal to the backup azimuth, the azimuth is reliable, and output the azimuth when the azimuth is determined as reliable, and
determine an integer bias to be used for the calculation of the GNSS attitude angle, the integer bias being determined by using the outputted azimuth.

2. The attitude angle calculating apparatus of claim 1, wherein the processing circuitry is further configured to estimate the sensitivity error, the misalignment error and the bias error of the magnetic sensor by using magnetic detection values and GNSS attitude angles obtained in three different attitudes.

3. The attitude angle calculating apparatus of claim 1, wherein the GNSS geomagnetism is expressed by a first direction component and a second direction component orthogonal to each other, and wherein the processing circuitry is further configured to calculate the first direction component of the GNSS geomagnetism at least based on a cosine of an azimuth angle of the GNSS attitude angle, and calculate the second direction component of the GNSS geomagnetism at least based on a sine of the azimuth angle of the GNSS attitude angle.

4. An attitude angle calculating apparatus, comprising:
a sensor error calculating device comprising:
processing circuitry configured to:
calculate a GNSS attitude angle based on positioning signals of a GNSS,
calculate a GNSS geomagnetism based on the GNSS attitude angle, and
estimate a sensitivity error, a misalignment error and a bias error of a magnetic sensor by using a magnetic detection value of the magnetic sensor and the GNSS geomagnetism, wherein
the processing circuitry is further configured to:
correct the magnetic detection value by using the sensitivity error, the misalignment error and the bias error of the magnetic sensor,
calculate an azimuth by using the error-corrected magnetic detection value,
determine a reliability of the azimuth by using the azimuth and a backup azimuth that is a previously calculated azimuth,
determine that, when the azimuth is substantially equal to the backup azimuth, the azimuth is reliable, and output the azimuth when the azimuth is determined as reliable, and
determine an integer bias to be used for the calculation of the GNSS attitude angle, the integer bias being determined by using the outputted azimuth.

5. The attitude angle calculating apparatus of claim 4, wherein the processing circuitry is further configured to estimate the sensitivity error, the misalignment error and the bias error of the magnetic sensor by using magnetic detection values and GNSS attitude angles obtained in three different attitudes.

6. The attitude angle calculating apparatus of claim 4, wherein the GNSS geomagnetism is expressed by a first direction component and a second direction component orthogonal to each other, and
wherein the processing circuitry is further configured to calculate the first direction component of the GNSS geomagnetism at least based on a cosine of an azimuth angle of the GNSS attitude angle, and calculate the second direction component of the GNSS geomagnetism at least based on a sine of the azimuth angle of the GNSS attitude angle.

* * * * *